United States Patent [19]
Marchand et al.

[11] Patent Number: 6,010,080
[45] Date of Patent: Jan. 4, 2000

[54] MULTIPLE FUNCTION MOBILE DEVICE FOR HANDLING EQUIPMENT

[75] Inventors: Alain Marchand, Charlesbourg; Raymond Hétu, St. Charles, both of Canada

[73] Assignee: Plamondon Campquip LTEE, Charlesbourg, Canada

[21] Appl. No.: 08/452,319

[22] Filed: May 26, 1995

[51] Int. Cl.$^7$ ................................................. B64D 1/18
[52] U.S. Cl. ........................... 239/172; 212/180; 212/248
[58] Field of Search ................................... 239/281, 172, 239/175, 176; 212/245, 248, 180; 414/543

[56] References Cited

U.S. PATENT DOCUMENTS

| | | |
|---|---|---|
| 776,053 | 11/1904 | Gifford . |
| 1,341,458 | 5/1920 | Finley . |
| 2,329,331 | 9/1943 | Brosemer . |
| 2,599,991 | 6/1952 | Hegre ........................................ 212/248 |
| 3,032,206 | 5/1962 | McIntyre .................................. 212/248 |
| 3,604,627 | 9/1971 | Miscovich . |
| 3,738,500 | 6/1973 | Coleman ................................... 212/248 |
| 4,081,200 | 3/1978 | Cheung . |
| 4,111,316 | 9/1978 | Wappler ................................... 212/248 |
| 4,505,396 | 3/1985 | Hedlund ................................... 212/248 |

FOREIGN PATENT DOCUMENTS

| | | | |
|---|---|---|---|
| 779283 | 11/1980 | Russian Federation ............... | 212/249 |

*Primary Examiner*—Robert J. Oberleitner
*Assistant Examiner*—C. T. Bartz

[57] ABSTRACT

The device is for mounting on a self-propelled vehicle which hydraulically operate the device. The device includes an articulated boom, a boom support on which the articulated boom is mounted, the articulated boom being fixed to the boom support. The equipment is mounted at the end of the articulated boom to be raised or lowered. A hydraulic system including also a rack and pinion is used to rotate the boom support about a vertical axis, which means that the equipment such as a spray nozzle may be positioned at selected locations by simultaneously or alternately raising or lowering the equipment and pivoting it around the vertical axis of the boom support.

10 Claims, 3 Drawing Sheets

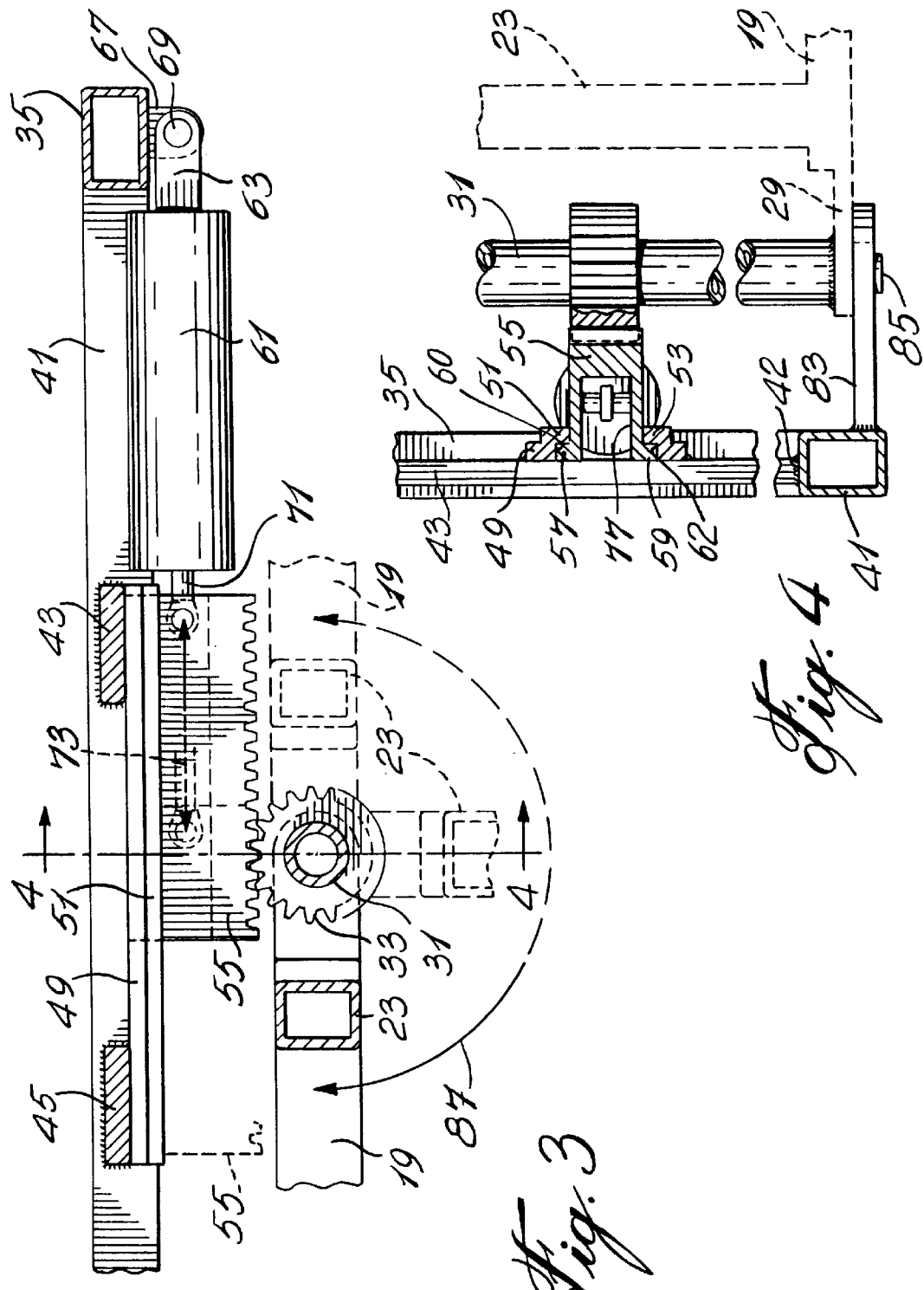

MULTIPLE FUNCTION MOBILE DEVICE FOR HANDLING EQUIPMENT

BACKGROUND OF INVENTION (a) Field of the Invention

This invention relates to a multiple function mobile device for handling equipment. More particularly, the present invention is concerned with a product sprayer of the type for mounting on a self-propelled vehicle such as a truck, and wherein as a result of the invention, the spray nozzle is adapted to be operated at selected locations without having to move the vehicle. This is made possible by providing an arrangement enabling to rotate a boom support around a vertical axis, thereby permitting to easily select the location where the end of the articulated boom associated with the boom support will be placed for a particular task.

(b) Description of Prior Art

Multiple function mobile devices of all kinds are well known, especially those to be attached to a common all purpose tractor. All these have in common an articulated boom at the end of which a piece of equipment is provided and which can be raised or lowered by operating the articulated boom. Normally, to move the equipment sideways, the vehicle has to be displaced with the obvious resulting inconveniences. Some of these devices are also provided with means to rotate the boom around a vertical axis. However, most of them suffer from disadvantages in that they are mechanically deficient or are not sufficiently sturdy.

There are known devices permitting to direct a jet laterally from the end of an articulated boom, such as shown in U.S. Pat. No. 3,604,627. As illustrated, this system provided a swivel joint to permit the rotation of a spray boom. The swivel joint is operated by means of an individual motor which drives a gear system and which of course makes up for a delicate construction and is naturally limited in power by the power and the size of the motor.

Other systems adapted for self-propelled vehicles are also known, such as those disclosed in U.S. Pat. Nos. 4,081,200 and 776,053. The first one relates to the removal of structural concrete and provides for a mechanism for lifting a water jet nozzle mechanism and for adjusting the orientation of the nozzles. U.S. Pat. No. 776,053 describes a system mounted at the rear of a truck and which permits only to lift the boom above the level of the truck. Other references of interest, include U.S. Pat. Nos. 2,329,331 and 1,341,458.

To Applicant's knowledge, there is not presently available a device which permits to operate an articulated boom by raising and lowering it outer end while rotating it around a vertical axis, and which is strong, sturdy and totally reliable by being essentially hydraulically operated.

It is therefore an object of the present invention to provide a multiple function mobile device for handling all kinds of equipment, such as a sprayer and which is substantially free of structural defects.

It is another object of the present invention to provide a multiple function mobile sprayer for mounting on a self-propelled vehicle, wherein its rotation is ensured by a hydraulically operated mechanism.

SUMMARY OF THE INVENTION

The above and other objects of the present invention may be achieved by means of a multiple function mobile device for handling equipment and for mounting on a self-propelled vehicle, the vehicle including means for hydraulically operating the device. The device includes an articulated boom, a boom support on which the articulated boom is mounted, and means for fixing the boom support to the vehicle. The equipment is mounted at the end of the articulated boom to be raised, lowered or rotated by the boom. The device comprises means including a hydraulic cylinder for rotating the boom support about a vertical axis thereby enabling to position the equipment at selected locations by simultaneously or alternately raising or lowering the equipment and pivoting it around the vertical axis of the boom support.

In accordance with a preferred embodiment of the invention, the rotating means comprises a rack and pinion means which is operated by means of the hydraulic cylinder.

In accordance with another preferred embodiment of the invention, the boom support comprises a vertical shaft which is arranged to cause rotation of the boom support around the above mentioned vertical axis upon rotation of the vertical shaft, a pinion fixedly mounted on the shaft, and the device includes a slidable rack which is engageable with the pinion to rotate the latter and thereby cause rotation of the shaft and of the boom support.

In accordance with another embodiment, there is also provided a frame which is mounted on the self-propelled vehicle. A horizontal sliding channel is mounted on the frame, and the rack is slidably disposed in the sliding channel.

In accordance with another preferred embodiment, the hydraulic cylinder comprises a piston rod operable between an extended and a retracted position. The piston rod has an outer end connected to an end of the rack. The hydraulic cylinder has an inner end fixed to the frame, so that retraction and extension of the piston rod cause the rack to slide back and forth in the sliding channel, which rack by engagement with the pinion, produces a rotation of the latter and of the shaft.

In accordance with yet another embodiment, the frame is rectangular, with lateral sides and top and bottom sides, and two vertical transverse members which are disposed parallel between the top and bottom sides and fixed thereto. The sliding channel is mounted on the transverse members and the inner end of the hydraulic cylinder is mounted on one of the lateral sides of the frame.

Preferably, the frame has angle irons fixed along its top side, is mounted on the bumper of the self-propelled vehicle by means of the angle irons and is also bolted thereto at the transverse members.

In accordance with another preferred embodiment, the boom support comprises bottom and top elongated members disposed in parallel and held together by means of an inner and an outer transverse brace. The elongated members extend past the inner transverse brace in the form of lower and upper tongue members, between which the shaft is fixedly mounted Other embodiments of the invention will appear from the description which follows.

BRIEF DESCRIPTION OF THE DRAWINGS

The invention will now be illustrated by means of the annexed drawings, it being understood that it is not restricted to the illustrated embodiment. In the drawings.

FIG. 3 is a view from the top; and

FIG. 4 is a cross-section view taken along line 4—4 of FIG. 3.

DESCRIPTION OF THE PREFERRED EMBODIMENT

Figure 1:
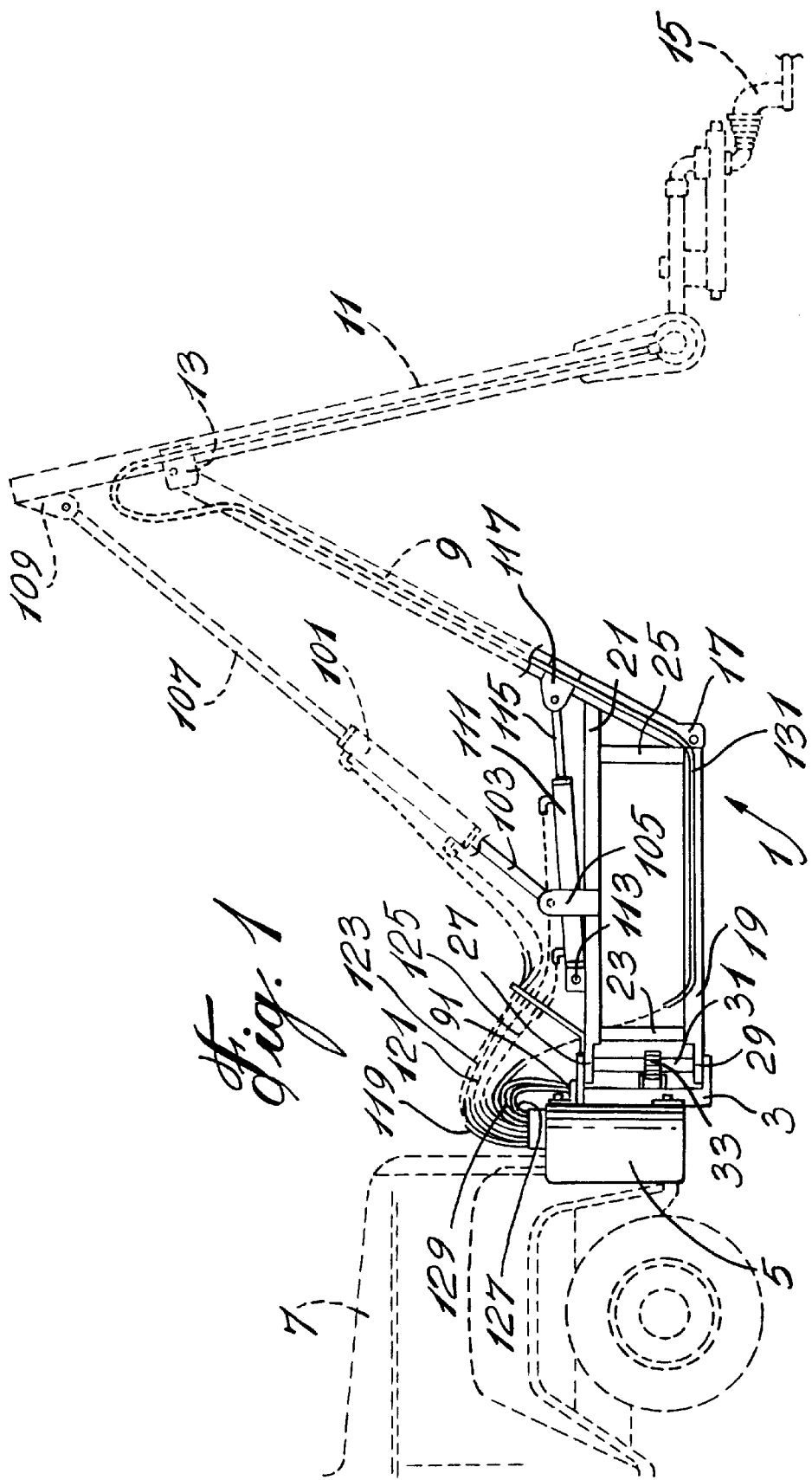
FIG. 1 is a side view of a device according to the invention, non essential parts being illustrated in dotted lines.

With reference to the drawings, it will be seen that the device according to the invention mainly comprises a boom support 1 which is mounted on a frame 3, the latter being fixed to the front bumper 5 of a self-propelled vehicle, here a truck 7 (shown in dotted lines). The boom itself is in the conventionally known construction of two arms 9 and 11 (shown in dotted lines), arm 11 being pivotably connected at an intermediate point thereof, preferably toward the inner end, to the outer end of arm 9, by means of a pivot connection 13 (also shown in dotted lines). A spray nozzle 15 (shown in dotted lines) of standard construction is mounted in known manner at the outer end of arm 11. Arm 9 is mounted to pivot at the bottom of boom support 1 by means of another conventional pivot connection 17.

Figure 2:
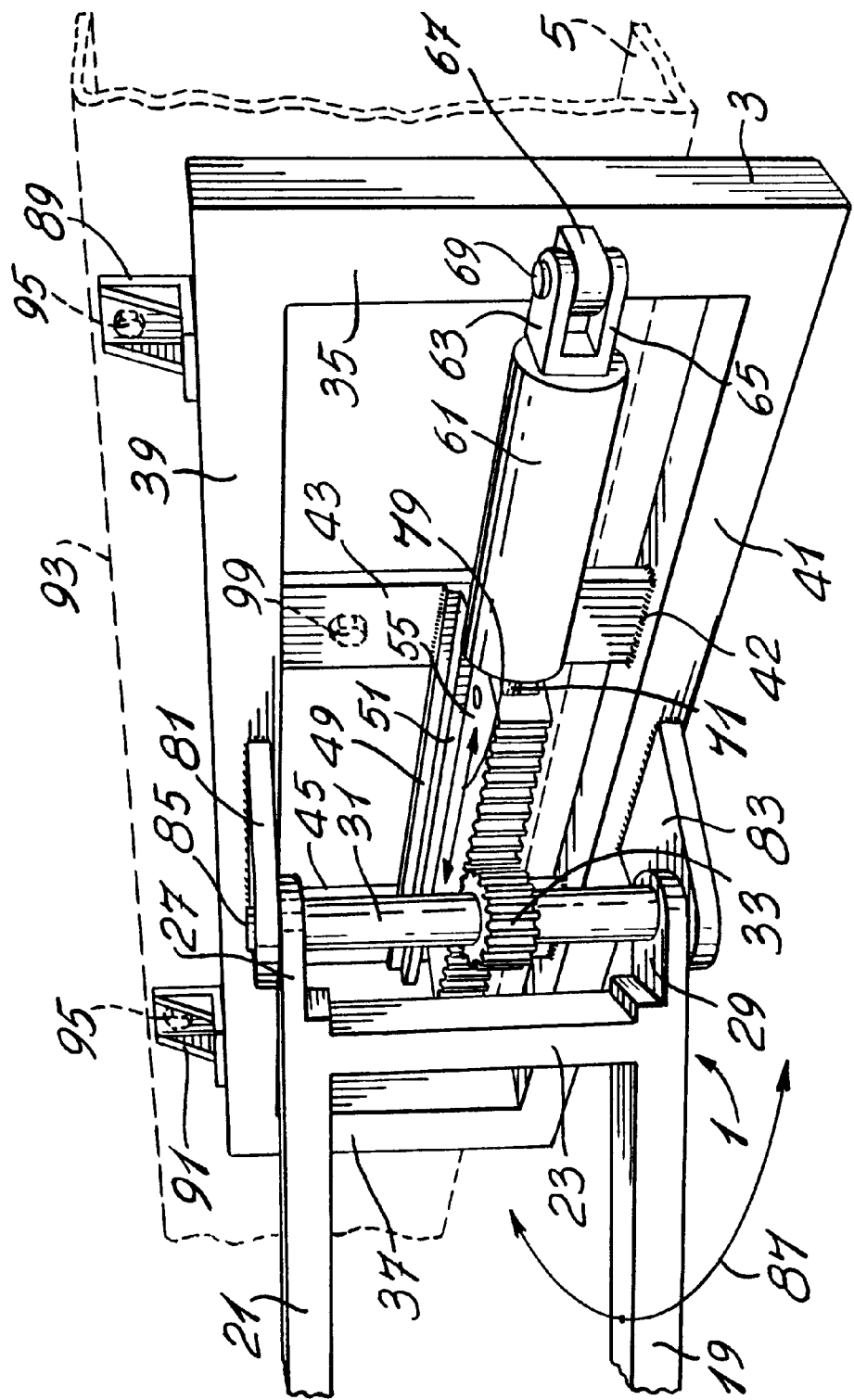
FIG. 2 is a perspective view thereof.

Turning now to the boom support per se, and with particular reference to FIGS. 1 and 2, it will be seen that it consists of a bottom elongated member 19 and a top elongated member 21 both parallel to one another and held together in rectangular fashion by means of an inner transverse brace 23 and an outer transverse brace 25. Braces 23 and 25 are fixed in known manner to the elongated members 19 and 21 such as by strong weld points or other means known to those skilled in the art. As shown, both elongated members 19 and 21 extend past inner transverse brace 23 in the form of upper and lower tongue members 27 and 29. A shaft 31 is fixedly mounted in a manner known to those skilled in the art, such as by welding or by being integral with all the parts of the boom support 1, so that any rotation of shaft 3 twill result is a rotation of boom support 1. Finally, a pinion 33 is provided on shaft 31 between the ends thereof, in such a manner that any rotation of pinion 33 will cause a corresponding rotation of the shaft 31. Mounting of the pinion in this manner, fixed to shaft 31, is of course well known to those skilled in the art and forms no part of the present invention. As shown in FIG. 1, it will be seen that pivot connection 17 is provided in known manner on boom support 1 to correspond to the outer end of elongated member 19.

Turning now to frame 3 on which boom support 1 is mounted, as will be explained below, and with particular reference to FIGS. 2 and 3, the latter is rectangular and for this purpose comprises lateral sides 35 and 37 and top and bottom sides 39 and 41. The four sides of the rectangular frame are normally cast as a unitary structure, although any other means of constructing the frame are within the scope of the present invention. In addition, two transverse members 43 and 45 are disposed in parallel fashion between the top and bottom sides 35 and 37. As shown, the two transverse members are in the form of metallic plates which are substantially thinner than the four lateral sides 35, 37, 39 and 41, and are welded against the inside faces of top and bottom sides 39, 41, as shown in FIG. 2, such as at 42. Furthermore, the plates are located somewhat behind the front face of the frame. A sliding channel 49 is fixedly mounted, in known manner, against the outer faces of the transverse members 43 and 45, the channel itself facing outwards. As shown more particularly with reference to FIG. 4, the top of sliding channel 49 has inwardly directed flanges 51 and 53 respectively which as discussed immediately below and are used to hold rack 55 therein. Rack 55, as indicated fits in sliding channel 49 and in order to be held therein, it is provided at the base with outwardly directed flanges 57 and 59. In other words, the rack is held inside sliding channel 49 by having its outwardly directed flanges 57, 59 held in the cavities 60, 62 defined by inwardly directed flanges 51, 53.

Referring more particularly to FIGS. 2 and 3, it will be seen that the device illustrated includes a hydraulic cylinder 61, of standard construction but strong enough to easily cause rotation of boom support 1, which is mounted on frame 3. To achieve this, a hinge mechanism consisting of jaws 63, 65 and bracket 67 pivotably connects the inner end of hydraulic cylinder to the front face of lateral side 35. This is made possible by fixing bracket 67 in known manner such as by welding, on the front face of the lateral side 35, as shown. On the other hand, jaws 63, 65 are fixed as shown, such as by welding, to the inner end of hydraulic cylinder 61. Bracket 67 fits between jaws 63, 65 and the hinge pivots in known manner at 69. At the other end of the hydraulic cylinder 61, there is a piston rod 71 which is slidable between a retracted position and an extended position shown in FIG. 3, these positions being shown here by the ends of arrow 73. Rod 71 is fixed to toothed rack 55, in known manner in a recess 77 formed therein. By sliding back and forth along arrow 73, rod 71 causes the toothed rack to slide within channel 49 along arrow 73. Furthermore, the toothed rack 55 is mounted so as to always be engaged with pinion 33 with the result that any sliding movement of rack 55 will rotate pinion 33 which will thereafter cause a rotation of boom support 1.

To connect boom support 1 to frame 3, triangular supports 81 and 83 are respectively mounted on top and bottom sides 39 and 41 of frame 3 to project forwardly therefrom as particularly shown in FIG. 2. Triangular supports 81 and 83 are spaced to exactly fit tongue members 27 and 29 therebetween. Pins 85 project from the outer faces of tongue members 81 and 83 and are engaged in openings (not shown in the drawings) provided in triangular supports 81 and 83 to permit a free rotation of boom support 1 relative to frame 3, along arrow 87 seen in FIGS. 2 and 3.

Referring now to FIGS. 1 and 2, it will be seen that two angle irons 89, 91 are fixed in known manner such as by soldering along the top face of top side 39 of frame 3. So, to mount frame 3 and boom support 1 on a self-propelled vehicle, it is merely necessary to bolt the frame on bumper 93 (shown in dotted lines in FIG. 2) by means of bolts 95, 97. Additionally, for better fixation, the frame is also bolted through transverse members 43 and 45 by means of bolts 99.

Referring now more particularly to FIG. 1, a description of the articulated boom will now be given. Arms 9 and 11 and their pivot connections 13 and 17 have already been described, as well as spray nozzle 15, which are all somewhat conventional, and are only inventive by the fact of being combined with boom support 1 according to the invention. A hydraulic cylinder 101 having a fixed rod 103 at one end is mounted on top of elongated member 21 of boom support 1 through pivot connection 105. At the other end, the hydraulic cylinder has an extendable rod 107 which is articulately connected at the inner end of arm 11 through pivot connection 109. Another hydraulic cylinder 111 is also mounted on top elongated member 21. Its inner end is mounted at pivot connection 113 while its piston rod 115 is connected at its outer end to arm 9 through pivot connection 117.

Finally a plurality of hydraulic fluid ducts 119, 121, 123, 125, 127, 129 are provided to operate the three hydraulic cylinders 61, 101 and 111. These ducts are also connected to a suitable hydraulic control means not shown, well known to those skilled in the art. A duct 131 is used to connect a source of spraying material not shown to spray nozzle 15.

The articulated boom is of course operated in known manner through both cylinders 101 and 111 for its vertical manipulation while any rotation is ensured by operating hydraulic cylinder 61 and boom support 1.

The invention is not restricted to the illustrated embodiment, and modifications are possible within the scope of the appended claims.

We claim:

1. A multiple function mobile device for handling equipment and for mounting ahead of a self-propelled vehicle on a front bumper thereof, said device including an articulated boom, a boom support extending horizontally away from said front bumper, said boom being mounted at a front end of said boom support, and means for fixing said boom support to said vehicle through said bumper, and said equipment being mounted at the end of said articulated boom to be raised or lowered by said articulated boom, said boom support comprising a vertical shaft provided at an inner end of said boom support, said shaft arranged to cause articulation of said boom support about a vertical axis defined by said vertical shaft, a hydraulically operable slidable rack disposed in said boom support at the inner end thereof and a pinion fixedly mounted on said vertical shaft, said slidable rack engaged with said pinion to rotate same and thereby cause rotation of said shaft and articulation of said boom support about said shaft, and first hydraulic means to cause said articulation of said boom support.

2. A multiple function mobile device according to claim 1, which comprises a frame mounted on said self-propelled vehicle, a horizontal sliding channel mounted on said frame, said rack being slidably disposed in said sliding channel, said first hydraulic means comprises a first hydraulic cylinder.

3. A multiple function mobile device according to claim 2, wherein said hydraulic cylinder comprises a piston rod operable between an extended and a retracted position, said piston rod having an outer end connected to an end of said rack, said hydraulic cylinder having an inner end fixed to said frame, so that retraction and extension of said piston rod cause said rack to slide back and forth in said sliding channel, said rack by engagement with said pinion produces rotation thereof and of said shaft.

4. A multiple function mobile device according to claim 3, wherein said frame is rectangular, having lateral sides and top and bottom sides, two vertical transverse members disposed parallel between said top and bottom sides and fixed thereto, said sliding channel being mounted on said transverse members, said inner end of said hydraulic cylinder being mounted on one said lateral side.

5. A multiple function mobile device according to claim 4, said frame having angle irons fixed along said top side, said frame being mounted on said bumper by means of said angle irons and being also fixed to said bumper at said transverse members.

6. A multiple function mobile device according to claim 5, wherein said boom support comprises bottom and top elongated members disposed in parallel and held together by means of an inner and an outer transverse brace, said elongated members extending past said inner transverse brace in the form of lower and upper tongue members, said shaft being fixedly mounted between said tongue members.

7. A multiple function mobile device according to claim 6, said boom comprising a first and a second arm, said first arm being articulated at an intermediate point thereof at an outer end of said second arm, said second arm being articulated at the outer end of said boom support at said bottom elongated member, a second and a third hydraulic cylinders both pivoted at their inner ends on said top elongated member, said second hydraulic cylinder having its outer end articulated at an inner end of said first arm, said third hydraulic cylinder having its outer end articulated at an intermediate point of said second arm.

8. A multiple function mobile device according to claim 7, which comprised tongue brackets respectively mounted on the top and bottom sides of said frame and forwardly projecting therefrom, said boom support being articulated to said frame by pivotably mounting said tongue members between said tongue brackets.

9. A multiple function mobile device according to claim 7, having a sprayer disposed at the end of said first arm, and means for feeding a spraying product thereto from a supply thereof provided on said self-propelled vehicle.

10. A multiple function mobile device for handling equipment and for mounting ahead of a self-propelled vehicle on a bumper thereof, said device including an articulated boom, a boom support on which said articulated boom is mounted, and means for fixing said boom support to said vehicle through said bumper, said boom support comprising a rectangular frame having lateral sides and top and bottom sides, vertical transverse members disposed parallel to the lateral sides between said top and bottom sides and fixed thereto, said boom support also comprising bottom and top elongated members disposed in parallel and held together by means of an inner and an outer transverse brace and extending horizontally away from said rectangular frame, said elongated members also extending past said inner transverse brace in the form of lower and upper tongue members, a vertical shaft fixedly mounted between said tongue members and having a pinion fixedly mounted thereon, a horizontal sliding channel mounted on said vertical transverse members and a rack slidably disposed in said horizontal sliding channel, said rack operatively engaged with said pinion, a first hydraulic cylinder having an inner end fixedly to said frame, said hydraulic cylinder comprising a piston rod operable between an extended and a retracted position, said piston rod having an outer end connected to an end of said rack, so that retraction and extension of said piston rod causes said rack to slide back and forth in said sliding channel, said rack by engagement with said pinion producing articulation of said boom support about said vertical shaft, and second and third hydraulic cylinders operatively mounted on said boom support to operate said articulated boom.

* * * * *

UNITED STATES PATENT AND TRADEMARK OFFICE
CERTIFICATE OF CORRECTION

| | | |
|---|---|---|
| PATENT NO. | : 6,010,080 | Page 1 of 1 |
| APPLICATION NO. | : 08/452319 | |
| DATED | : January 4, 2000 | |
| INVENTOR(S) | : Alain Marchand and Raymond Hétu | |

It is certified that error appears in the above-identified patent and that said Letters Patent is hereby corrected as shown below:

Title Page, Item (73) Assignee should read:

-- Plamondon Camquip LTEE, Charlesbourg, Canada --

Signed and Sealed this
Sixth Day of December, 2011

David J. Kappos
*Director of the United States Patent and Trademark Office*